INVENTOR
Hans Joachim Schwerdhöfer
By: Low and Berman
Agents

March 11, 1969 H. J. SCHWERDHÖFER 3,432,015
REVERSIBLE ONE-WAY CLUTCH WITH PILOT BRAKE
Filed June 7, 1966

INVENTOR
Hans Joachim Schwerdhöfer
By: Low and Berman
Agents

INVENTOR
Hans Joachim Schwerdhöfer
By: Low and Berman
Agents

United States Patent Office 3,432,015
Patented Mar. 11, 1969

3,432,015
REVERSIBLE ONE-WAY CLUTCH WITH PILOT BRAKE
Hans Joachim Schwerdhöfer, Schweinfurt, Germany, assignor to Fichtel & Sachs A.G., Schweinfurt, Germany
Filed June 7, 1966, Ser. No. 555,756
Claims priority, application Germany, June 15, 1965,
F 46,333, F 46,334
U.S. Cl. 192—43.1     14 Claims
Int. Cl. F16d *11/06, 13/04, 43/00*

ABSTRACT OF THE DISCLOSURE

A double-acting freewheeling clutch whose input, coupling, and output members are mounted on a sleeve coaxially receiving the driven shaft. The output member of the clutch is permanently coupled to the shaft.

---

This invention relates to apparatus for transmitting rotary motion between a source of power and a driven load, and particularly to a double-acting freewheeling clutch which permits motion or torque to be transmitted in two directions of rotation, and also permits freewheeling of the output portion of the clutch in both directions when its speed exceeds that of the input portion.

A clutch of the type described finds a field of application in pedal-driven toy vehicles, but also in other vehicles intended to be driven forward and backward under power, and to coast freely in either direction when the ratio of traveling speed to drive speed exceeds a certain value.

An object of the invention is the provision of a clutch of the type described which is simple in its construction and installation and occupies but little space.

Another object is the provision of a clutch capable of operating in the manner outlined above which is rugged, and has a long useful life.

With these and other objects in view, it is proposed to support the input portion and the output portion of the clutch on a common shaft for forward and backward rotation about the shaft axis and to interpose the coupling portion of the clutch between the input and output portions in such a manner that it transmits torque in both directions between the input and output portions in response to power applied to the input portion while a load, which may be merely a fricion load, tends to impede rotation of the output portion.

The coupling portion of the clutch includes a freewheeling device which permits the output portion to rotate freely in either direction when the output portion rotates in the same direction as the input portion, but at a higher speed.

In preferred embodiments of the invention, the input and output portions of the clutch are mounted on a sleeve in which the afore-mentioned shaft is rotatably received. The shaft is coupled to the output portion of the clutch for joint rotation.

The coupling portion of the clutch can preferably be shifted between two positions. In one position, torque may be transmitted from the input to the output portion in a forward direction of rotation, forward freewheeling of the output portion is possible, but backward rotation of the output portion is prevented. In the other position of the coupling portion, the backward rotation of the output portion is actuated or permitted, while forward rotation is impossible. A control mechanism shifts the coupling portion of the clutch between its positions in response to the corresponding rotation of the input portion.

The control mechanism may include an element which is rotatably supported on the afore-mentioned shaft and engages the coupling portion of the clutch to move the latter between its two positions in response to the rotation of the control element. The latter is connected to the input portion by a lost-motion coupling which rotates the control element after a predetermined initial angular movement of the input portion. A brake yieldably impedes rotation of the control element.

The brake may include a supporting member and an unattached inert mass whose center of gravity is radially spaced from the axis of the shaft on which the supporting member is rotatably arranged. When the shaft axis extends horizontally, the inert mass biases the supporting member toward a preferred position. The control element frictionally engages the supporting member.

The input and output portions of the clutch are preferably at least partly axially coextensive so that the coupling portion of the clutch may be placed radially between the two other portions.

The input portion of the clutch may consist of a driver and a pawl carrier attached to the driver, and the output portion of the clutch may consist of a ratchet and other elements attached thereto. Pawls pivotally arranged on the carrier constitute the coupling portion of the clutch, and the two positions of the coupling portion are constituted by the retracted and operative positions of the pawls which engage the ratchet when in the operative position.

Other features, additional objects, and many of the attendant advantages of this invention will be readiy appreciated as the same becomes better understood by reference to the following detailed description of preferred embodiments when considered in connection with the appended drawings in which.

Figure 1:
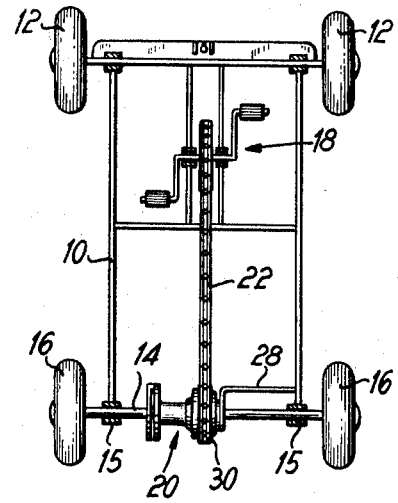
FIG. 1 shows the frame and running gear of a toy vehicle equipped with the clutch of the invention in plan view.

Referring now to the drawing in detail, and initially to FIG. 1, there is seen as much of a toy vehicle as is needed for an understanding of this invention, the body and steering mechanism having been removed.

An H-frame 10 carries a front axle assembly including freely rotating wheels 12 which may be steered in a conventional manner, not shown in detail. A drive shaft 14 journaled in bearing 15 on the frame 10 carries fixedly attached rear wheels 16. The source of motive power for the vehicle is a conventional pedaling mechanism 18 mounted between the cross-bar of the frame 14 and the front axle assembly. A drive chain 22 connects the mechanism 18 with a freewheeling clutch 20 on the drive shaft 14.

Figure 2:
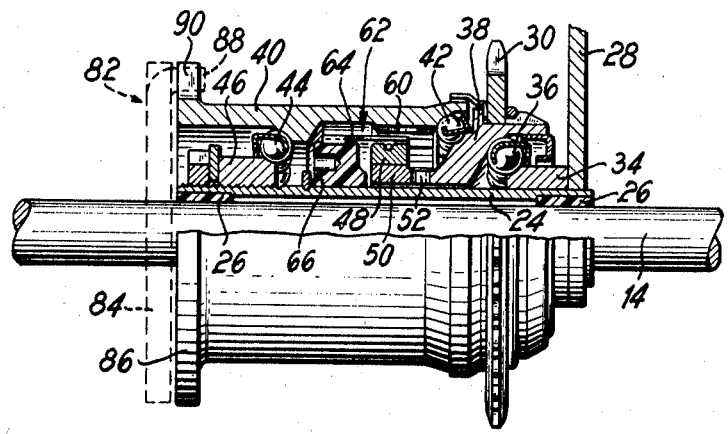
FIG. 2 illustrates the clutch of the vehicle of FIG. 1 in plan view on a larger scale and partly in axial section.

As seen in FIG. 2, which shows the clutch with which this invention is more specifically concerned, a cylindrical sleeve 24 is rotatably mounted on the shaft 14 by means of plastic bushings 26. A bracket 28 mounted on the frame 14 and attached to the sleeve 24 prevents rotation of the sleeve with the shaft 14. The sleeve 24 carries the remaining structure of the clutch 20. Annular inner bearing races 34, 46 of respective ball bearings 36, 44 are axially spaced on the sleeve 24. A sprocket 30, over which the chain 22 is trained, is fixedly fastened to a tubular driver 38 coaxially supported on the ball bearing 36 and on the sleeve 24 itself. A ball bearing 42 and the aforementioned ball bearing 44 rotatably support a shell 40 which is the output member of the clutch 20 and encloses most of its operating elements. The inner race 46 is axially adjustable on the sleeve 24 for proper support of the shell 40.

Figure 3:
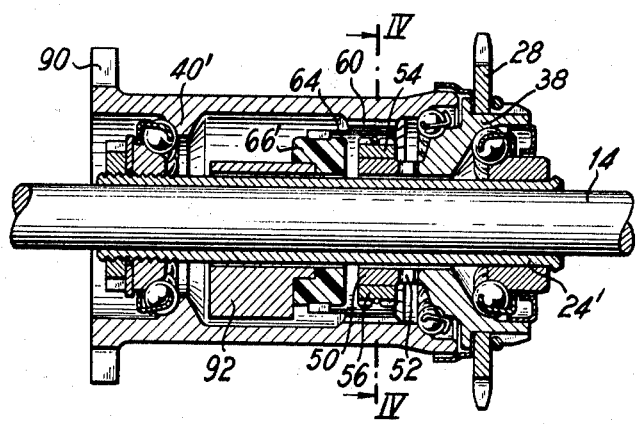
FIG. 3 shows a modified clutch for the apparatus of FIG. 1.
Figure 4:
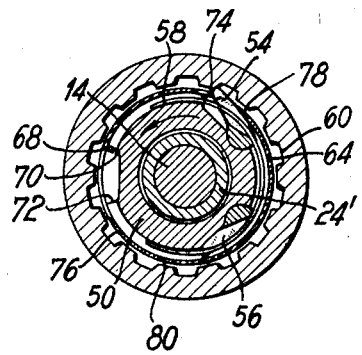
FIG. 4 illustrates the clutch of FIG. 3 in radial section on the line IV—IV.

A pawl-and-ratchet coupling 48 connects the driver 38 to the shell 40 as is seen in more detail in FIG. 4 which shows the corresponding, almost identical elements of the modified clutch illustrated in FIG. 3. The coupling 48 includes an annular pawl carrier 50 which is connected to the driver 38 by a claw coupling 52 for convenient assembly so that it is actually an element of the input structure in the operative condition of the clutch. The carrier 50 has two recesses in the circumference thereof in which pawls 54, 56 are respectively arranged. Engagement between cooperating cylindrical surfaces of the carrier and pawls permits the latter to pivot between a retracted position in which the pawl 56 is shown in FIG. 4, and an operative position exemplified by the pawl 54 in FIG. 4, the arrangement being such that the pawl 54 moves counterclockwise from the operative to the retracted position, as reviewed in FIG. 4, and the pawl 56 clockwise. An annular pawl spring 58 received in circumferential slots of the pawls 54, 56 and of the pawl carirer 50 biases the pawls toward the operative position in which they engage a ratchet 60 integral with the shell 40.

Only one of the pawls 54, 56 can engage the ratchet 60 at any one time, and engagement of the pawls with the ratchet is controlled by a mechanism 62 which includes a ring 64 mounted on a supporting ring 66 with a friction fit. The ring 66 is fixedly fastened on the sleeve 24. A lost-motion coupling connects the control ring 64 with the pawl carrier 50. The coupling is formed by an integral lug 68 which projects radially inward from the control ring 64 and by radial abutment faces 70, 72 on the pawl carrier 50 which limit relative angular movement of the carrier 50 and the control ring 64 to approximately 45°.

In the position illustrated in FIG. 4, the lug 68 abuttingly engages the face 70, and the pawl 54 is aligned with an opening 74 of the ring 64 so that it projects through the opening 74 into engagement with the ratchet 60 under the pressure of the spring 58. The pawl 56 is retained in its retracted position by an imperforate portion of the ring 64. Rotation of the pawl carrier 50 in the direction of the arrow in FIG. 4 is transmitted by the pawl 54 to the shell 40. When the shell rotates more rapidly that the pawl carrier 50 and the attached driver 38, the ratchet 60 overtravels the pawl 54. When the lug 68 is shifted into engagement with the abutment face 72, the pawl 54 is retracted by camming engagement with an edge 78 of the ring 64 in the opening 74 and the pawl 56 engages the ratchet 60 through an opening 76 in the ring 64. It is retracted by camming engagement with an edge 80 of the ring 64 when the latter reverts to the illustrated position.

Movement of the shell 40 is transmitted to the drive shaft 14 and to the wheels 16 by a permanently engaged coupling 82 consisting of flanges 84, 86 respectively fixedly mounted on the shaft 14 and on the shell 40, and connected by an axial lug 88 on the flange 84 which engages a notch 90 in the flange 86.

The freewheeling clutch described above operates as above:

As long as the pedalling mechanism 18 is operated to rotate the driver 38 and the attached pawl carrier 50 in the counterclockwise or forward direction indicated by the arrow in FIG. 4, the elements of the clutch 20 remain in the relative position shown in FIG. 4. Motive power may be transmitted from the mechanism 18 to the rear wheels 16, and the wheels may rotate freely when the pedaling mechanism 18 is stopped or rotated more slowly than corresponds to the wheel speed.

When the pedaling direction is reversed, the pawl carrier 50 moves clockwise, as viewed in FIG. 4, while the control ring 64 is held in or near the illustrated position by its frictional engagement with the supporting ring 66 until the abutment face 72 engages the lug 68. The ring 64 thereafter rotates with the pawl carrier 52 in a relative position in which the pawl 54 is retracted, and the pawl 56 is operative to transmit clockwise or backward rotation from the driver 38 to the shell 40 and to permit backward freewheeling of the hub 40 and of the fixedly connected wheels 16 when the pedaling mechanism is stopped or rotated at a speed slower than that corresponding to the wheel speed.

The modified clutch illustrated in FIG. 3 is identical with that described above with reference to FIGS. 2 and 4 except for the provision of a weight 92 which is rotatably, but eccentrically mounted on the carrier sleeve 24′, and is fixedly attached to a friction ring 66′ similarly rotatable on the sleeve. The sleeve 40′ is modified to provide necessary space for rotation of the weight 92.

The unbalanced weight 92 is normally held by gravity in the position shown in FIG. 3 and impedes or prevents rotary movement of the supporting ring 66′ which cooperates with a control ring 64 as described above with reference to the ring 66. The clutch illustrated in FIG. 3 thus operates essentially in the same manner as described above. It does not require means for arresting rotation of its carrier sleeve, and the sleeve 24′ may or may not rotate with the shaft 14 on which it is mounted with a sliding fit, but without antifriction bushings 26.

Figure 5:
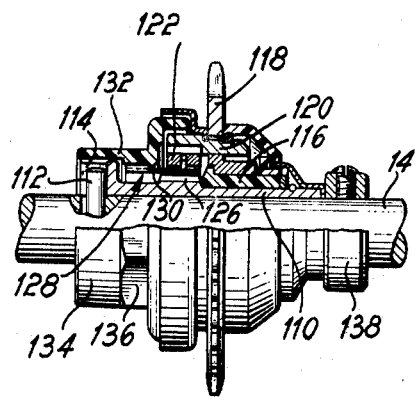
FIG. 5 shows yet another clutch for the vehicle of FIG. 1 in a view corresponding to that of FIG. 2.

The freewheeling clutch shown in FIG. 5 has a carrier sleeve 110 secured on the shaft 14 against rotation by a radial pin 112 which passes through a bore in the shaft 14 and is received in a groove or recess 114 in an end face of the sleeve 110. A collar 138 on the shaft 14 at the other end face of the sleeve 110 axially secures the sleeve.

A tubular bearing member 116 of low-friction material is interposed between the sleeve 110 and a driver 120 to which a sprocket 118 for the chain 22 is attached. Two pawls, of which only one pawl 122 is seen in FIG. 5, are received in respective recesses in an internal, otherwise cylindrical face of the driver 120. While one of the pawls engages an external output ratchet 126 on the carrier sleeve 110, the other is retained by a control ring 130 of a control mechanism 128 in a manner closely analogous to the mode of operation of the pawl-and-ratchet coupling described above.

The ring 130 is connected to the driver 120 by a non-illustrated lost-motion coupling identical with that shown in FIG. 4 except for the inversion of all radial relationships. The ring 130 frictionally engages an internal face of a shell or casing 132 which encloses the control mechanism 128 and the pawl-and-ratchet coupling. A portion 136 of the external casing face 134 is of hexagonal cross section for engagement with a non-illustrated bracket on the vehicle frame, analogous to the bracket 28, which prevents rotation of the casing 132.

The clutch illustrated in FIG. 5 permits the vehicle shown in FIG. 1 to be pedaled forward or backward, and also permits freewheeling vehicle movement on a downgrade or otherwise when the traveling speed exceeds the corresponding pedaling rate in the same manner as the clutches of FIGS. 2 to 4.

The clutch illustrated in FIG. 6 has a carrier sleeve 210 which is secured against rotation with the shaft 14 by a bracket 212 attached to the vehicle frame in the manner described with reference to FIG. 1. The sleeve 210 carries internal bearing races 214, 226 for ball bearings 216, 224. A tubular driver 218 is mounted on the bearing 216, and is held in position by an enveloping shell 222 mounted on the driver by means of a ball bearing 220 and on the afore-mentioned bearing 224. A sprocket 230 is fixedly attached to the driver 218 whereas the shell 222 is connected to the shaft 14 by a flanged connection 228, the structure of FIG. 6 described so far being closely analogous to or identical with the corresponding elements illustrated in FIG. 2.

Coarse external threads 232 on the driver 218 engage corresponding internal threads 234 of a coupling ring 236 whose outer face has two coaxial conical portions 238, 242 having a common base and tapering in opposite directions from the base. The inner face of the shell 222 is formed with a corresponding groove having two conical faces 240, 244 which are alternatively engaged by respective portions 238, 242 of the ring face when the ring 236 moves axially from the illustrated position on the engaged threads 232, 234. A leaf spring 246 looped about the sleeve 210 and having a radially extending end portion received in a slot of the ring 236 impedes rotation of the ring by its frictional engagement with the sleeve 210.

Rotation of the driver 218 by the sprocket 230 causes threaded displacement of the ring 236, whose rotation is impeded by the spring 246, until one of its conical faces 238 or 242 engages the corresponding face 240 or 244 of the shell 222 under the pressure provided by the pedaling mechanism 18, whereby the shell is thereafter rotated with the driver 218, and the spring 246 slides on the sleeve 210.

When the rear wheels of the vehicle attached to the shell 222 by the shaft 14 and the connection 228 rotate faster than the corresponding speed of the driver, the contact pressure between the ring 236 and the shell 222 is relaxed, and the shell may overtravel the ring 236. When the direction of pedaling is reversed, the ring 236 travels axially away from an engaged face 240, 244 of the shell 222 and into engagement with the other face of the shell, the lost motion of the clutch of FIG. 6 being determined by the combined axial spacings between the conical faces of the ring 236 and of the shell 222.

Figure 6:
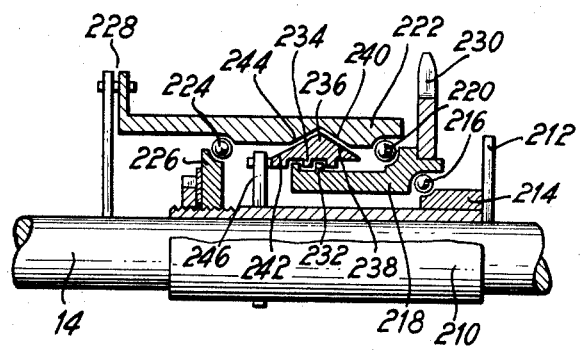
FIG. 6 shows an additional clutch.

The clutch shown in FIG. 6 thus operates in the vehicle of FIG. 1 as the afore-described clutches illustrated in FIGS. 2 to 5.

FIGS. 7 to 12 illustrate clutches for use with non-illustrated modifications of the vehicle of FIG. 1 in which the pedaling mechanism 18 is connected with the rear wheels 16 individually, or with the rear wheel drive shaft 14 by means of a counter shaft driven by the chain 22, and one or more additional chains interposed between the countershaft and the wheels or the drive shaft. The countershaft arrangement is not novel in itself, and FIGS. 7 to 12 are limited to a showing of the necessary modifications in the clutch.

Figure 7:
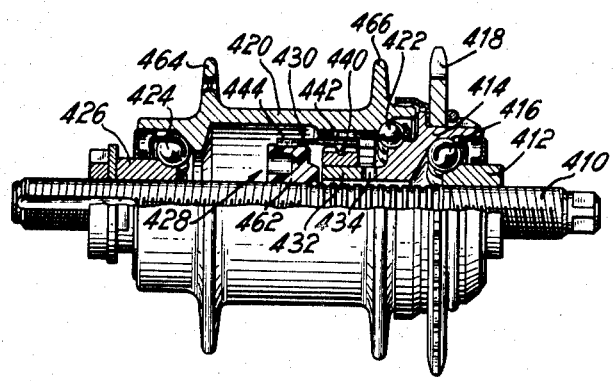
FIG. 7 shows a freewheeling clutch of the invention for use with a modification of the vehicle shown in FIG. 1.

Referring first to FIG. 7, there is shown a clutch whose carrier is a stationary shaft 410 provided with axially spaced inner bearing races 412, 426 of which the latter is axially adjustable. A ball bearing 416 on the race 412 and a portion of the shaft 410 which is circumferentially grooved to reduce friction, support a driver 414 equipped with a sprocket 418. A ball bearing 422 on the driver and a ball bearing 424 on the race 426 support a shell 420 which encloses most of the operating elements of the clutch.

The driver 414, which is an input member of the clutch, is connected to the output member, the shell 420, by a pawl-and-ratchet coupling 428 substantially identical with the afore-described coupling 48, and controlled by mechanism 430 not substantially different from the control mechanism 62.

Figure 8:
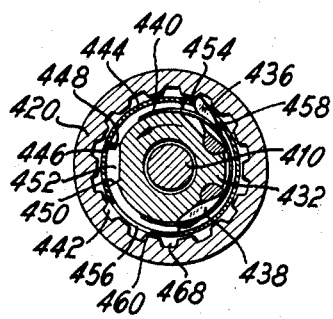
FIG. 8 shows the clutch of FIG. 7 in a view corresponding to that of FIG. 4.
Figure 9:
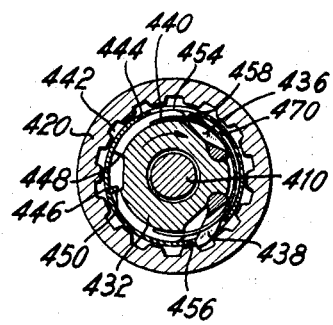
FIGS. 9 and 10 show the apparatus of FIG. 8 in different operative conditions.
Figure 10:
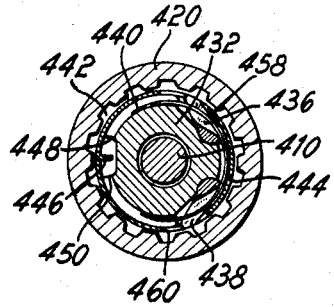

A pawl-carrier 432 is coupled for joint rotation with the driver 414 by a claw coupling 434, and carries two pawls 436 and 438 biased by an annular pawl spring 440 toward the operative position, as better seen in FIGS. 8 to 10, in which the pawls engage a ratchet 442 integral with the shell 420. A control ring 444 is partly axially coextensive with the pawls 436, 438, and is connected with the pawl carrier 432 by a lost-motion coupling including an integral, radially projecting lug 446 on the ring 444 which permits the ring 444 to move about the clutch axis relative to the pawl carrier 432 through an angle of about 45° between respective positions of abutting engagement of the lug 446 against radial abutment faces 448, 450 on the pawl carrier 432.

The lug 446 moves in a recess 452 of the pawl carrier 432 between two terminal positions respectively shown in FIGS. 8 and 9, and an intermediate position illustrated in FIG. 10. In the position of FIG. 8, closely analogous to that of FIG. 4, the pawl 436 extends through an opening 454 in the control ring 444 and engages the ratchet 442 for driving the latter in a counterclockwise direction, as viewed in FIGS. 8 to 10, while permitting the ratchet to overtravel the pawl. The pawl 38 is held in the retracted position by an imperforate portion 468 of the ring 444.

In FIG. 9, the pawl 436 is held in the retracted position by a ring portion 470, and the pawl 438 passes radially outward through an opening 456 in the ring 444 for engagement with the ratchet 442. During movement of the pawl carrier 432 relative to the control ring 444 between the terminal positions of FIGS. 8 and 9, edges 458, 460 of the ring adjacent the recess 452 cammingly engage the pawls for retracting them, as has been described with reference to FIG. 4. In the intermediate position of FIG. 10, both pawls 436, 438 are sufficiently retracted by the associated edges 458, 460 to hold them out of contact with the ratchet 442, and to prevent the noise which is characteristic of a pawl sliding over a ratchet. Such an intermediate position is also available, of course, with the clutch shown in FIGS. 2 and 4.

The control ring 444 is mounted on a supporting ring 462 with a friction fit in the manner described above. The shell 420 is equipped with two axially spaced flanges 464, 466 which are provided with axial bores uniformly spaced about their circumference for receiving wire spokes in a manner conventional in the hubs of bicycle wheels.

The clutch illustrated in FIGS. 7 to 10 is intended for use as a wheel hub in each of the driven wheels of a vehicle similar to that shown in FIG. 1, but provided with a countershaft carrying three sprockets, a central sprocket being connected with the pedaling mechanism 18 by the chain 22, and two sprockets at the ends of the countershaft being each connected by a chain with a rear wheel equipped with a hub of the type shown in FIGS. 7 to 10, and mounted on a corner of the frame 10 by means of a stationary shaft 410. The operation of the vehicle is the same as that described above with reference to FIG. 1.

Figure 11:
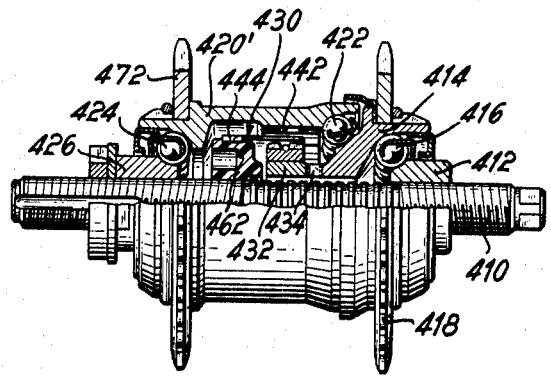
FIG. 11 shows a freewheeling clutch of the invention for use with yet another modification of the vehicle of FIG. 1, the view being in elevation, and partly in axial section.

Except for a modified shell 420′, the clutch illustrated in FIG. 11 is substantially identical with that shown in FIGS. 7 to 10. The shell 420′ lacks the perforated flanges 464, 466, and is not intended to carry wire spokes. An output sprocket 472 is fixedly attached to the shell 420′. The modified clutch of FIG. 11 is suitable for use between the pedaling mechanism 18 of the vehicle of FIG. 1 and the drive shaft 14. The fixed shaft 410 shown in FIG. 11 is mounted on the frame 10 as a countershaft, the chain 22 is trained over the sprocket 418, and another chain and a sprocket fixedly mounted on the drive shaft 14 are used for coupling the drive shaft and the rear wheels 16 to the output sprocket 472.

The mode of operation of the vehicle is the same as with the several clutches of the invention described hereinabove. The clutch shown in FIG. 11 permits forward and backward pedaling, freewheeling of the vehicle in a forward direction after forward pedaling, freewheeling of the vehicle in a backward direction after backpedaling, and freewheeling in either direction if the operator carefully moves his pedals until the ratcheting sound stops in the position of the pawl-and-ratchet coupling shown in FIG. 10.

Figure 12:
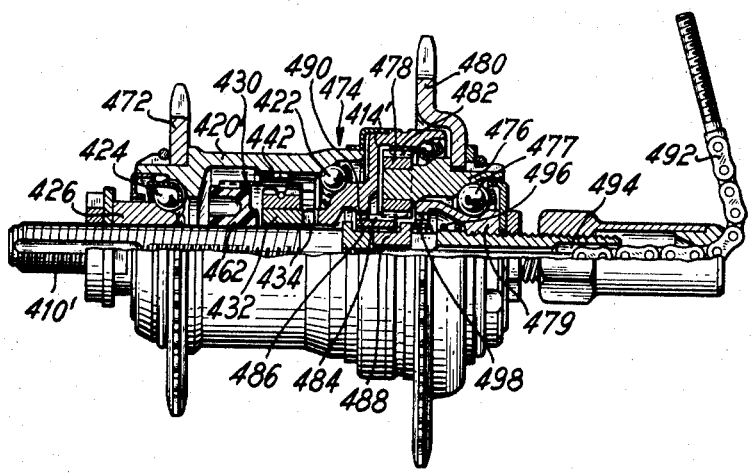
FIG. 12 shows a modification of the clutch of FIG. 11.

The clutch of the invention illustrated in FIG. 12 is intended for mounting as a countershaft in the same manner as described in the preceding paragraph. The device of FIG. 12 differs from that of FIG. 11 mainly by the provision of a dual-speed planetary gear transmission arranged between the input sprocket 480 and a pawl-and-ratchet coupling, the latter and its control mechanism 430 being identical with the corresponding elements shown in FIG. 11 or FIG. 7.

The ring gear 414' of the transmission is coupled to a pawl carrier 432 by a claw coupling 434, and its internal teeth 482 mesh with planet gears 478 on a planet carrier 476, only one planet gear being seen in the drawing. The planet carrier 476 is supported on a shaft 410' by means of an annular inner race 479 and bearing balls 477. A sun gear 486 is rotatably mounted on the shaft 410', and is held in a desired axial position by a slide 488 which is axially movable in a slot of the shaft 410'.

The elongated teeth 484 of the sun gear 486 simultaneously engage the planet gears 478 and internal teeth 490 on the ring gear 414' in the position of FIG. 12. The sprocket 480 is fixedly mounted on the planet carrier 476. In the position of the apparatus illustrated in FIG. 12, the sprocket 480, planet carrier 476, sun gear 486, and ring gear 414' rotate as a unit. The clutch portion of the device operates otherwise as described above with reference to FIG. 11.

The slide 488 is attached to the terminal portion of a chain 492 which is movably received in an axially open bore 494 of the shaft 410'. A heavy helical return spring 496 axially interposed between the slide 488 and the bearing race 479 biases the slide toward the illustrated position. The chain 492 is the end portion of a tension connection between the slide 488 and a non-illustrated operating lever on the body of the vehicle shown in FIG. 1. When the lever is operated in a known manner to pull the slide 488 toward the right, as viewed in FIG. 12, the sun gear 486 is disengaged from the internal teeth 490 of the gear 414', and its teeth 484 engage teeth 498 on the stationary bearing race 479. When the sprocket 480 is turned in the shifted position of the slide 488, the planet wheels 478 roll on the fixed sun gear 486, and turn the ring gear 414' at a speed higher than that of the sprocket 480.

When the shaft 410' is interposed as a countershaft between the pedaling mechanism 18 and the drive shaft 14 with the wheels 16 of the vehicle shown in FIG. 1 in the manner described with reference to FIG. 11, the vehicle, in addition to the operating features referred to above, is provided with a dual transmission ratio between the pedaling mechanism and the driven wheels.

While the invention has been described with particular reference to the motion transmitting apparatus for a toy vehicle in which a pedaling mechanism is the source of motive power, the double-acting freewheeling clutch of the invention may be employed in other vehicles which require motion transmitting trains of similar characteristics, and in devices other than vehicles.

What is claimed is:

1. A motion transmitting apparatus for a vehicle and like applications comprising, in combination:
 (a) a shaft having an axis;
 (b) input means and output means supported on said shaft for forward and backward rotation about said axis;
 (c) coupling means operatively interposed between said input means and said output means for transmitting torque therebetween in a forward and backward direction in response to motive power applied to said input means while a load tends to impede rotation of said output means,
  (1) said coupling means including freewheeling means permitting said output means to rotate freely in a forward direction when said output means rotates in said forward direction at a speed higher than the speed of said input means,
  (2) said freewheeling means permitting said output means to rotate freely in said backward direction when said output means rotates in said backward direction at a speed higher than the speed of said input means,
  (3) one of said input means and said output means including pawl carrier means and the other one including ratchet means,
  (4) said coupling means including two pawls;
 (d) mounting means securing said pawls to said pawl carrier means for movement between respective retracted positions and respective operating positions,
  (1) said pawls in said operative positions engaging said ratchet means for selectively driving the same in a forward and in a backward direction respectively when said pawl carrier means moves forward and backward respectively;
 (e) a control member supported on said shaft for angular movement about said axis and arcuately extending about said axis between said pawl carrier means and said ratchet means,
  (1) said control member being formed with two openings therethrough; and
 (f) actuating means responsive to forward and backward rotation of said pawl carrier means respectively for moving said control member into two positions in which a respective one of said pawls extends through an associated opening in the control member into engagement with said ratchet means whereas the other pawl is held in the retracted position by the control member.

2. A motion transmitting apparatus for a vehicle and like applications, comprising in combination:
 (a) a sleeve member;
 (b) a shaft having an axis and being received in said sleeve member;
 (c) input and output means mounted on said sleeve member for rotation about said axis;
 (d) first coupling means operatively interposed between said input means and said output means for transmitting torque therebetween in response to motive power applied to said input means while a load tends to impede rotation of said output means,
  (1) said coupling means including freewheeling means permitting said output means to rotate freely in a forward direction when said output means rotates in said forward direction at a speed higher than the speed of said input means,
  (2) said freewheeling means permitting said output means to rotate freely in a backward direction opposite to said forward direction when said output means rotates in said backward direction at a speed higher than the speed of said input means;
 (e) second coupling means fixedly connecting said output means to said shaft.

3. An apparatus as set forth in claim 2, further comprising control means, said freewheeling means permitting said output means to rotate freely in said first direction only in a first condition of said freewheeling means, said freewheeling means in a second condition thereof permitting said output means to rotate freely in said backward direction, said control means shifting said freewheeling means between said conditions thereof in response to reversal of the direction of rotation of said input means.

4. An apparatus as set forth in claim 2, wherein said first coupling means is shiftable between a first position in which the first coupling means is capable of transmitting torque from said input means to said output means in a forward direction while permitting free rotation of the output means in said forward direction at said higher speed and preventing backward rotation of said output means; and a second position in which the first coupling means is capable of transmitting torque from said input means to said output means in a backward direction while permitting free rotation of the output means in said backward direction at said higher speed and preventing forward rotation of said output means, the apparatus further comprising control means responsive to said forward rotation of said input means for shifting said first coupling means from said second to said first position thereof, and responsive to said backward rotation of said input means for shifting said coupling means from said first to said second position thereof.

5. An apparatus as set forth in claim 4, wherein said control means include a control member rotatably supported on said shaft, engaging means on said control member engageable with said first coupling means for moving the same between said positions thereof, in response to rotation of said control member, lost-motion coupling means connecting said control member to said input means for rotary movement of the control member with said input means after a predetermined initial angular movement of the input means, and brake means for yieldably impeding said rotary movement of the control member.

6. An apparatus as set forth in claim 5, said brake means including a supporting member on said shaft, said axis extending in a horizontal direction, and an inert mass having a center of gravity spaced from said axis and attached to said supporting member for biasing the same toward a position in which said center of gravity is downwardly spaced from said axis, said control member frictionally engaging said supporting member.

7. An apparatus as set forth in claim 2, wherein respective portions of said input means and said output means are axially co-extensive, and said coupling means are radially interposed between said portions.

8. An apparatus as set forth in claim 2, wherein said coupling means include a coupling member mounted on said input means for threaded movement about said axis and having two conical annular faces about said axis flaring in opposite directions, said output means having two conical faces respectively conformingly engageable by the faces of said coupling member in two axially spaced positions of the coupling member, and yieldable means impeding rotation of said coupling member about said axis relative to said input means.

9. A motion transmitting apparatus for a vehicle and like applications, comprising in combination:
  (a) a sleeve member;
  (b) a shaft having an axis and being received in said sleeve member;
  (c) input and output means mounted on said sleeve member for rotation about said axis;
  (d) first coupling means operatively interposed between said input means and said output means for transmitting torque therebetween in response to motive power applied to said input means while a load tends to impede rotation of said output means,
    (1) said coupling means including freewheeling means permitting said output means to rotate freely in a forward direction when said output means rotates in said forward direction at a speed higher than the speed of said input means;
  (e) second coupling means fixedly connecting said output means to said shaft,
    (1) one of said input means and said output means including pawl carrier means and the other one including ratchet means, and said first coupling means including two pawls and mounting means securing said pawls to said pawl carrier means for movement between respective retracted positions and respective operative positions, said pawls in said operative positions engaging said ratchet means for selectively driving the same in a forward and in a backward direction respectively when said pawl carrier means moves forward and backward respectively.

10. An apparatus as set forth in claim 9, further comprising a control member supported on said shaft for angular movement about said axis and arcuately extending about said axis between said pawl carrier means and said ratchet means, said control member being formed with two openings therethrough, and actuating means responsive to forward and backward rotation of said pawl carrier means respectively for moving said control member into two positions in which a respective one of said pawls extends through an associated opening in the control member into engagement with said ratchet means whereas the other pawl is held in the retracted position by the control member.

11. An apparatus as set forth in claim 10, wherein said pawl carrier means include a unitary pawl carrier member, said pawls being mounted on said member for pivotal movement between said positions thereof.

12. An apparatus as set forth in claim 10, wherein said actuating means include lost motion coupling means connecting said pawl carrier means to said control member for delayed rotary movement of said control member about said axis with said pawl carrier means.

13. An apparatus as set forth in claim 12, wherein said control member is annular about said axis and radially offset from said pawl carrier means, the lost motion coupling means including two radially extending circumferentially spaced faces on said pawl carrier means defining a space therebetween, and abutment means on said control member circumferentially movable in said space between positions of abutting engagement with said faces respectively.

14. An apparatus as set forth in claim 10, further comprising means on said control member for holding said two pawls in the retracted positions thereof when said control member is in a third position intermediate said two positions.

References Cited

UNITED STATES PATENTS

| | | | |
|---|---|---|---|
| 1,285,736 | 11/1918 | Kinsman | 192—6 |
| 3,055,471 | 9/1962 | Warn | 192—45 |
| 3,256,966 | 6/1966 | Angquist | 192—43.1 |
| 3,324,744 | 7/1967 | Roper | 192—44 |

FOREIGN PATENTS 405,444  11/1909  France.

BENJAMIN W. WYCHE III, *Primary Examiner.*

U.S. Cl. X.R.

74—750; 192—3.6, 36, 41, 43